Patented Nov. 8, 1949

2,487,060

UNITED STATES PATENT OFFICE 2,487,060

BARRIER COAT FOR ADHESIVE SHEETS

Charles Olson Pike and Vion Neilan Morris, Highland Park, N. J., assignors to Industrial Tape Corporation, a corporation of New Jersey No Drawing. Application November 20, 1946, Serial No. 711,210

5 Claims. (Cl. 117—122)

This invention relates to adhesive sheets or tapes having flexible porous backings provided with adhesives united thereto which have flow characteristics in their activated state.

By way of example, such a tape may comprise a rubber-resin or synthetic normally tacky pressure-sensitive adhesive composition applied by calendering or by solvent or hot melt spreading to a porous backing such as paper, cloth, woven glass, etc.

In its activated state, an adhesive requires a certain amount of inherent flow. On porous backings, this inherent flow often causes deep penetration of the adhesive into the backing with a corresponding decrease in the effective thickness of the adhesive layer. Excessive penetration into the backing results in a waste of costly material, often not readily available, and frequently reduces the quality of the final product.

According to the present invention, such difficulties are avoided by using a new and improved barrier coat located between the adhesive layer and the porous backing. This barrier coat is firm yet flexible and presents a uniform surface to receive the adhesive coating. It serves to prevent penetration of the material of the adhesive layer into the porous backing. The improved barrier coat comprises a synthetic rubber having special characteristics as will hereinafter appear.

Synthetic rubber is commonly defined as a substance having the principal characteristics of natural rubber and which can be vulcanized. Those currently available are known as GR-S (a copolymer comprising usually 40% or more of butadiene and 60% or less of styrene), GR-N (a copolymer comprising usually 40% or more of butadiene and 60% or less of acrylonitrile), GR-M (polychloroprene) and GR-I (a copolymer comprising for the most part polyisobutylene with a small amount of isoprene or butadiene, giving it an unsaturation of less than that found in natural rubber). In the production of these synthetic rubbers very high molecular weight batches sometimes occur. High molecular weight polymers, however, have been considered undesirable by the rubber industry in general, indeed present government specifications call for polymers of relatively low molecular weight. For example, in the case of GR-S, molecular weights corresponding to Mooney values (at 100° C.) up to 140 have been made whereas present government specifications call for polymers having Mooney values of only 40 to 60. (A definition of Mooney values and a description of the means necessary to measure them appear in Industrial and Engineering Chemistry—Analytical Edition, vol. 2, p. 147, 1943.)

The improved barrier coats contemplate the use of synthetic rubbers having extra high molecular weights corresponding to Mooney values between 70 and 140. A typical synthetic rubber of the type contemplated and which has a Mooney plasticity within the given range may be prepared in the manner described in publication No. U-1469 dated June 2, 1944, distributed by Rubber Reserve Corporation. In this publication, the following ingredients in the specific proportions by weight are given:

| | |
|---|---|
| Water | 200 |
| Butadiene | 75 |
| Styrene | 25 |
| Sodium soap of dehydrogenated rosin | 5 |
| Dodecyl mercaptan | 0.58 |
| Potassium persulfate | 0.60 |

The above ingredients are put into a pressure reactor, preferably one having a glass lining. For convenience, the soap and the persulfate may be added as aqueous solutions and the dodecyl mercaptan in solution in styrene. The ingredients are emulsified by agitation with a high-speed stirrer, and the reactor is maintained at a temperature of 125° C., which is controlled by circulating water of suitable temperature through its walls.

After 16 hours, using ingredients of high purity, a 75 per cent conversion into copolymer is obtained. At this point, hydroquinone (approximately 0.1 part by weight) is added to act as a short stop for the polymerization. The copolymer is flocculated in the customary manner with salt and acid, washed, dried and sheeted. The result of this process is a synthetic rubber having a Mooney plasticity of 85-90 at 100° C.

Extra high molecular weight synthetic rubbers are superior to natural rubbers for use in barrier coats because they may be satisfactorily processed without danger of deterioration or "breakdown." Their high molecular weights are more readily maintained during processing. They produce barrier coats having a tight molecular network which prevents penetration by superimposed coatings, and provides more resistance to penetration by solvents, superior aging characteristics, and excellent heat resistance. They give good anchorage, particularly to related synthetic adhesives and may be loaded with fillers to a greater extent than natural rubber. All these properties are the criteria for the ideal barrier coat. The manner in which the improved barrier coat and barrier coats made from other typical materials compare with such criteria is set forth in the following table showing the relative advantages and disadvantages of a large number of barrier coats made from various elastomeric bases.

Comparison of typical barrier coats

| Material | Resistance to flow | Tightness of Molecular Network | Resistance to Hydrocarbon Solvents | Resistance to Heat | Stability on Aging | Processing Facility |
|---|---|---|---|---|---|---|
| Unvulcanized crude rubber. | Poor; suitable only in rare cases. | Very poor | Very poor | Poor; sensitive to flow. | Poor; softens | Breaks down and softens during processing. |
| Vulcanized crude rubber. | Excellent | Fair; better than unvulcanized crude rubber. | Good | Heat causes loss of adhesion and deadening of adhesive mass. | Poor; age tends to soften barrier coat, to cause loss of adhesion and deadening in the mass. | Processing is complicated and difficult due to added problems of compounding and curing. |
| GR-S Mooney 40-50 (Regular). | Poor; but better than crude rubber. | Poor | Poor | Better than unvulcanized crude rubber; not enough for many applications. | Good; age causes slight hardening of barrier coat. | Processes with good facility but results in low viscosity solutions which strike through fibrous bases to which applied. |
| GR-S Mooney 70-140 (Extra High). | Excellent | Excellent high gel structure in the network. | Good | Very resistant to heat. | ----do---- | Processes with good facility and is satisfactory on application to fibrous bases. |

While synthetic rubbers within the stated range may be used alone, it is preferred to combine with them up to 75 per cent of compatible plasticizers, resins, and fillers. Polyterpenes, coumarone-indene resins, rosin derivatives, especially the rosin esters and rosin derivative esters, hydrocarbons, mineral oils, and other compatible resins and plasticizers have helped to improve anchorage to fibrous backings and ease of calendering. Good results have been obtained with compositions comprising 25 per cent plasticizers and resins. All types of fillers have proven useful. They may comprise up to 70 per cent of the compositions.

In considering the limits for Mooney values of the synthetic rubbers producing best results, some differences should be noted. With materials having an inherent degree of flow, such as GR-I, best results are obtained when the Mooney value is very high, i. e., nearer the upper limit of the range given above for synthetic rubbers of extra high molecular weights; whereas, with materials having poorer flow characteristics such as GR-S, best results are obtained when the Mooney value is lower, preferably within the range 75 to 100.

In the following examples, which are given by way of illustration only and not in a limiting sense, the various percentages are by weight:

Example 1

| | Per cent |
|---|---|
| GR-M type GN-Hard (polychloroprene of extra high molecular weight) | 57 |
| Magnesium oxide | 14 |
| Clay | 29 |

In the above composition magnesium oxide and clay serve as fillers. They may be used in any desired ratio or either to the exclusion of the other. This composition possesses good aging characteristics and resistance to solvents. Preferably, it is spread on the backing from a solution, using an aromatic or aromatic-aliphatic solvent.

Example 2

| | Per cent |
|---|---|
| GR-S (butadiene-styrene copolymer; Mooney value 85 to 90) | 30 |
| Calcium carbonate | 60 |
| Coumarone-indene resin | 5 |
| Unsaturated hydrocarbon of fluid consistency | 5 |

In this example, the calcium carbonate is a filler; the resin serves to soften the composition and improve the bond between the barrier coat and the backing material; and the hydrocarbon serves as a plasticizer. A suitable calcium carbonate may be Surfex made and sold by the Diamond Alkali Corporation; a suitable hydrogenated coumarone-indene resin is Nevillite #123 made and sold by the Neville Company; and a suitable unsaturated hydrocarbon is Naftolen R-100 made and sold by the Wilmington Chemical Corporation. This barrier coat is applied to the porous backing preferably by calendering at elevated temperatures. The Nevillite resin, which has a melting point above 150° C., and the Naftolen improve the calendering characteristics of the composition. Naftolen may be omitted where the hydrogenated coumarone-indene resin has a lower melting point. This composition has been found extremely stable.

In addition to the extra high molecular weight synthetic polymers to which reference has been made, the invention also contemplates the use of lower molecular weight synthetic polymers brought up to an equivalent consistency by a suitable cure. Following is an illustrative example of such a barrier coat composition:

Example 3

| | Per cent |
|---|---|
| GR-S (copolymer of butadiene and styrene; Mooney value approximately 50) | 47.58 |
| Zinc oxide | 32 |
| Hydrogenated rosin glyceride | 12.5 |
| Petroleum hydrocarbon oil (largely alicyclic) | 8 |
| Pentamethylene thiuram tetrasulfide | .21 |
| Butyl zimate | .21 |

In this example, the zinc oxide serves as a filler and also improves the cure characteristics of the composition. The resin acts as a softening agent and improves the bond between the barrier coat and the backing to which it is applied. The hydrogenated rosin glyceride actually used was Staybelite Ester No. 10 made and sold by the Hercules Powder Company, although any other compatible resin will suffice. The petroleum hydrocarbon oil serves as a plasticizer and may suitably be Circo-Lite Oil, a product of the Sun Oil Company. Pentamethylene thiuram tetrasulfide and butyl zimate are curing agents. The former may be obtained under the trade name "Tetrone" A, from E. I. du Pont de Nemours & Company and the latter under the trade name "Butasan," from Monsanto Chemical Company. Either of these curing agents may be used alone although it has been found that better results are obtained when the two are combined.

The above barrier coat composition is suitably compounded and cured for 20 to 30 minutes on a mill heated by steam and then applied to the backing by calendering. This barrier coat compound likewise has been found extremely stable.

Example 4

| | Per cent |
|---|---|
| GR-I Class A (butyl rubber) | 36.5 |
| Ester gum | 14.5 |
| Calcium carbonate | 36.5 |
| Petroleum hydrocarbon oil (largely alicyclic) | 9.5 |
| Beeswax | 1.5 |
| P-quinone dioxime | 0.6 |
| Lead dioxide | 0.9 |

This barrier coat composition may be compounded and cured on a mill heated by steam for 20 to 40 minutes and then calendered onto the porous backing.

GR-I Class A is a standard grade of GR-I rubber of extra low Mooney value. The ester gum serves to improve the bond between the barrier coat and the adjacent backing and while that resin is preferred in this composition, any compatible resin will suffice. Petroleum hydrocarbon oil and the beeswax serve as plasticizers and the p-quinone dioxime and lead dioxide as curing agents.

Adhesive sheets and tapes made with the improved barrier coats may be used in surgical dressings, insulating wrappings, decorative and other wall coverings, industrial tapes, and for many other purposes. Normally tacky and pressure-sensitive adhesives of the type used in such adhesive sheets are well-known in the art and repeated reference thereto may be found in the patent literature. Pressure-sensitive adhesives which may be used with the improved barrier coats are typified by the following examples which show all parts by weight:

Example 5

| | |
|---|---|
| GR-S copolymer of 75% butadiene and 25% styrene having a Mooney value of 55 | 100 |
| Zinc oxide | 75 |
| Clay | 25 |
| Rosin glyceride | 75 |
| Mineral oil | 15 |
| Conventional rubber antioxidant | 1.5 |

Example 6

| | |
|---|---|
| Crude rubber | 100 |
| Zinc oxide | 50 |
| Aluminum hydroxide | 50 |
| Rosin | 80 |
| Pine tar | 10 |
| Phenyl beta naphthylamine | 2 |

Example 7

| | |
|---|---|
| Carcass rubber reclaim | 100 |
| Clay | 28 |
| Polyterpene (melting point 100° C.) | 60 |
| Paraffin oil | 20 |
| Conventional rubber antioxidant | 1.5 |

Example 8

| | |
|---|---|
| Polyisobutylene (molecular wt. 80,000) | 100 |
| Factice | 30 |
| Liquid polyisobutylene | 80 |
| Aluminum hydrate | 200 |
| Mineral oil | 10 |
| Polyterpene (melting point 70° C.) | 100 |

The above adhesives or such other adhesives as may be preferred may be compounded in the conventional manner, e. g., on a rubber mixer and applied from solvent or by heat or calendering.

The invention is subject to many modifications and changes which are included within its spirit. It is to be understood, therefore, that it is to be limited only by the prior art and the scope of appended claims.

This application is a continuation in part of application Serial No. 534,817, filed May 9, 1944, in the names of C. Olson Pike and Vlon Neilan Morris, now abandoned.

What is claimed is:

1. An adhesive sheet having a flexible and porous backing presenting interstices throughout one of its surfaces, a firm yet flexible intermediate barrier coat united to the surface of the backing presenting the interstices and having a uniform surface to which there is joined a pressure-sensitive mass possessing flow characteristics in its activated state and serving to prevent the mass from entering the interstices of the backing, said barrier coat comprising major portions of calcium carbonate filler and of a vulcanizable rubber copolymer of butadiene and styrene having a Mooney viscosity value between 75 and 100 and capable of maintaining substantially such viscosity value during processing, and minor portions of compatible coumarone-indene resins and fluid plasticizer.

2. An adhesive sheet having a flexible and porous backing presenting interstices throughout one of its surfaces, a firm yet flexible intermediate barrier coat united to the surface of the backing presenting the interstices and having a uniform surface to which there is joined a pressure-sensitive mass possessing flow characteristics in its activated state and serving to prevent the mass from entering the interstices of the backing, said barrier coat comprising major portions of inert inorganic filler and of a vulcanizable rubber copolymer of butadiene and styrene having a Mooney viscosity value between 75 and 100 and capable of maintaining substantially such viscosity value during processing, and minor portions of compatible resins and hydrocarbon plasticizer.

3. An adhesive sheet having a flexible and porous backing presenting interstices throughout one of its surfaces, a firm yet flexible intermediate barrier coat united to the surface of the backing presenting the interstices and having a uniform surface to which there is joined a pressure-sensitive mass possessing flow characteristics in its activated state and serving to prevent the mass from entering the interstices of the backing, said barrier coat comprising major portions of inert inorganic filler and of a vulcanizable synthetic rubber having a Mooney viscosity value between 75 and 100 selected from the group consisting of a copolymer comprising butadiene and styrene, a copolymer comprising butadiene and acrylonitrile, a copolymer comprising polyisobutylene and a small amount of butadiene, and polychloroprene, and capable of maintaining substantially such viscosity value during processing, and a minor portion of a compatible hydrocarbon plasticizer.

4. An adhesive sheet having a flexible and porous backing presenting interstices throughout one of its surfaces, a firm yet flexible intermediate barrier coat united to the surface of the backing presenting the interstices and having a uniform surface to which there is joined a pressure-sensitive mass possessing flow characteristics in its activated state and serving to prevent the mass from entering the interstices of the backing, said barrier coat comprising major portions of inert inorganic filler and an extra high molecular weight vulcanizable synthetic rubber having a Mooney viscosity value between 70 and 140 selected from the group consisting of a copolymer comprising butadiene and styrene, a copolymer comprising butadiene and acrylonitrile, a copolymer comprising polyisobutylene and a small amount of butadiene, and polychloroprene, and capable of maintaining substantially such viscosity value during processing.

5. An adhesive sheet having a flexible and porous backing presenting interstices throughout one of its surfaces, a firm yet flexible intermediate barrier coat united to the surface of the backing presenting the interstices and having a uniform surface to which there is joined a pressure-sensitive mass possessing flow characteristics in its activated state and serving to prevent the mass from entering the interstices of the backing, said barrier coat comprising major portions of inert inorganic filler and of an extra high molecular weight chloroprene polymer having a Mooney viscosity value between 70 and 140 and capable of maintaining substantially such viscosity value during processing.

CHARLES OLSON PIKE.
VLON NEILAN MORRIS.

REFERENCES CITED

The following references are of record in the file of this patent:

UNITED STATES PATENTS

| Number | Name | Date |
|---|---|---|
| 1,784,523 | Hopkinson | Dec. 9, 1930 |
| 2,273,880 | Mitchell | Feb. 24, 1942 |
| 2,295,613 | Stillwell | Sept. 15, 1942 |
| 2,328,066 | Drew | Aug. 31, 1943 |

OTHER REFERENCES

India Rubber World of Aug. 1946, pages 680–681.